(12) United States Patent
Mori et al.

(10) Patent No.: US 7,836,632 B2
(45) Date of Patent: Nov. 23, 2010

(54) PLANT-CULTIVATING CONTAINER AND PLANT-CULTIVATING METHOD

(75) Inventors: Yuichi Mori, Yokohama (JP); Makiko Kubota, Enzan (JP)

(73) Assignee: Mebiol Inc., Tokyo (JP)

( * ) Notice: Subject to any disclaimer, the term of this patent is extended or adjusted under 35 U.S.C. 154(b) by 0 days.

(21) Appl. No.: 10/647,076

(22) Filed: Aug. 22, 2003

(65) Prior Publication Data
US 2004/0093793 A1 May 20, 2004

Related U.S. Application Data

(63) Continuation of application No. 09/959,223, filed as application No. PCT/JP00/02552 on Apr. 19, 2000, now abandoned.

(30) Foreign Application Priority Data

Apr. 19, 1999 (JP) ................. 11-111039

(51) Int. Cl.
*A01G 31/00* (2006.01)
(52) U.S. Cl. ........................................ 47/59 R
(58) Field of Classification Search .............. 47/65.7, 47/65.8, 65.5, 62 A, 64, 59 R, 60, 63
See application file for complete search history.

(56) References Cited

U.S. PATENT DOCUMENTS

| | | | |
|---|---|---|---|
| 129,451 A | 7/1872 | Baldwin | |
| 2,169,250 A * | 8/1939 | Izard | .......... 525/57 |
| 2,773,050 A * | 12/1956 | Caldwell et al. | .......... 524/459 |
| 2,780,401 A * | 2/1957 | Stevens | .......... 229/406 |
| 3,097,787 A * | 7/1963 | Schur | .......... 383/94 |
| 3,800,471 A | 4/1974 | Adams | |

(Continued)

FOREIGN PATENT DOCUMENTS

DE 2821881 A1 * 11/1978

(Continued)

OTHER PUBLICATIONS

Israel Office Action, dated Aug. 18, 2005, for patent application No. 146,042.

*Primary Examiner*—Timothy D Collins
*Assistant Examiner*—Monica Williams
(74) *Attorney, Agent, or Firm*—Christie, Parker & Hale, LLP

(57) ABSTRACT

There are provided a plant-cultivating container and a plant-cultivating method which facilitate "water control", which is particularly important in view of the control of the gaseous environment in soil and the soil moisture environment. In the above-mentioned plant-cultivating container, a selective moisture vapor-permeable portion which prevents water from passing through it, but which allows water vapor to pass through is provided as at least a portion of the container having a receiving portion for receiving a plant body. Water per se cannot pass into the container through the selective moisture vapor-permeable portion, but water vapor can selectively pass into the container. As a result, the relative humidity in the container to a can be increased degree which contribute to the growth of the plant disposed in the container, and the frequency of supply and/or the amount of water per se provided to a plant by a measure such as irrigation can be, at least, reduced markedly.

9 Claims, 6 Drawing Sheets

U.S. PATENT DOCUMENTS

| | | | |
|---|---|---|---|
| 4,299,056 A | | 11/1981 | Towning |
| 4,698,135 A | | 10/1987 | Raab |
| 4,725,481 A | | 2/1988 | Ostapchenko |
| 4,928,426 A | | 5/1990 | Janssens |
| 5,224,598 A | | 7/1993 | Angeles et al. |
| 5,363,592 A | * | 11/1994 | Weder et al. ............... 47/66.7 |
| 5,379,549 A | | 1/1995 | Carcich et al. |
| 5,522,970 A | | 6/1996 | Shimizu et al. |
| 5,664,369 A | | 9/1997 | Kertz |
| 5,761,847 A | | 6/1998 | Ito et al. |
| 5,946,854 A | | 9/1999 | Guillemain et al. |
| 2004/0093793 A1 | * | 5/2004 | Mori et al. ................... 47/65.7 |

FOREIGN PATENT DOCUMENTS

| | | | |
|---|---|---|---|
| DE | 10020625 A1 | | 10/2001 |
| EP | 0 238 941 A1 | | 9/1987 |
| FR | 2 559 024 A1 | | 8/1985 |
| JP | 55-54825 | | 4/1980 |
| JP | 55-054825 | * | 4/1980 |
| JP | 7-45169 | * | 10/1995 |
| JP | 8-214707 | | 8/1996 |

* cited by examiner

PLANT-CULTIVATING CONTAINER AND PLANT-CULTIVATING METHOD

This application is a continuation of U.S. application Ser. No. 09/959,223, filed Oct. 18, 2001 now abandoned, which is the National Stage of International Application No. PCT/JP00/02552, filed Apr. 19, 2000, which in turn claims priority of Japanese Patent Application No. 11-111039, filed on Apr. 19, 1999.

TECHNICAL FIELD

The present invention relates to a plant-cultivating container and a plant-cultivating method. More specifically, the present invention relates to a plant-cultivating container having a water-impermeable and moisture vapor (or water vapor)-permeable portion, as at least a portion of the container; and a plant-cultivating method using such a container.

When the plant-cultivating container according to the present invention is used, a plant can be cultivated in a manner whereby the moisture vapor environment in the support (such as soil, cultivating soil, and cultivating carrier) is favorably maintained while markedly reducing the amount of irrigation or support (such as soil) provided for the plant. Further, when the plant-cultivating container according to the present invention is used, it is extremely easy to precisely control the environment in the rhizosphere of a plant body (such as humidity, temperature and oxygen concentration in the rhizosphere).

BACKGROUND ART

In recent years, along with increasingly strengthened international competition among different types of industries (such as competition with bio-industry), so-called cost consciousness has been raised in, among others, the field of agriculture. In the field of agriculture, similarly as in the other industries, it is extremely important to provide high-quality products as efficient as possible (in other words, at the lowest cost). However, on the basis of the particularity in products (farm products) in the agriculture and in the production processes used in agriculture (especially on the basis of the fact that such products are "living"), it is necessary to adopt specialized designs or device for use in the field of the agriculture, which is different from those in the other industries.

From ancient times, it has naturally been an essential technique in agriculture to cultivate plants (or seedlings) of good quality. However, in recent years, for various reasons, such as aging in the agricultural working population, insufficient numbers of workers in farming areas, and improvements in seedling-producing techniques, there has been a tendency for a so-called division of labor to develop wherein professional suppliers produce seedlings, and common agricultural workers purchase the seedlings as "commercially available products".

The specialization of seedling production has necessarily provided large-scale production facilities for producing seedlings of plants. In such production facilities, of course, techniques have been energetically developed for producing a large amount of better-quality seedlings at lower cost.

In general, the growth of seedlings is greatly influenced by the environment in view of the quality and quantity thereof, and thus environment control is an extremely important factor in seedling production. Examples of the environmental conditions which need to be controlled during seedling production, i.e cultivation of plant bodies, include: lighting, temperature, humidity, amount of soil moisture and gas concentration in the soil.

Among these environmental conditions, both sunlight and artificial light have been used as a light source in traditional seedling-producing facilities. The temperature is regulated by heating or cooling the inside of a greenhouse. In addition, soil moisture is regulated by irrigation, and the gaseous environment in the soil is regulated by controlling soil gas permeability.

In the various environment control techniques described above, one particularly important factor is the regulation of soil moisture. As irrigation methods employed for the purpose of regulating soil moisture content, simple sprinkling methods (i.e. methods of sprinkling water from the upper head portions of plants by means of sprinkling devices such as watering cans and sprinklers) have been commonly used. Also employed are the drip irrigation method, the subirrigation (ebb-and-flood) method, etc. However, whichever of these methods is used, an expensive irrigation facility and correct irrigation control are required. In addition, when the most common overhead sprinkling method is used, the entirety of the plant body is wetted, including parts of the plant body near the ground and soil in the neighborhood of the earth surface, whereby the risk of damage due to disease tends to increase. In general, most plants are cultivated under a soil moisture condition corresponding to a pF value in the range of 1.5-2.5, which is a numerical value representing the soil moisture tension (With respect to the details of the "pF value", the paper "Comprehensive Soil Theories" (DOJOU TSUURON), written by Yasuo Takai and Hiroshi Miyoshi, published by Asakura Shoten, 1977, pp. 88-89 may be referred to).

When irrigation water supplied is insufficient, growth of a plant is suppressed. On the other hand, when irrigation is excessive, the plant is softened and weakened, and rapid changes in wet and dry conditions result in water stress on the plant body, decreasing its resistance to damage from disease. As described above, it is difficult to appropriately control irrigation to a certain degree, which is greater than the difficulty which would generally be expected. In addition, excessive moisture content due to over-irrigation adversely affects the gaseous environment in the soil, resulting in possible failure of the plant to grow, and therefore it is necessary to strictly limit or control the time of irrigation, and the amount of irrigation water.

Further, with respect to the above-mentioned gaseous environment in the soil, this is characterized in that it has a lower oxygen concentration and a higher carbon dioxide concentration, as compared with those in the atmosphere. This is because oxygen is absorbed and carbon dioxide is generated by the roots and microbes present in the soil. In general, when the oxygen concentration in the soil decreases, and the carbon dioxide concentration increases relatively, plant growth is suppressed. In particular, the carbon dioxide concentration in the soil tends to become higher the greater the depth from the earth surface, whereas, conversely, the oxygen concentration tends to decrease.

The diffusion coefficient of gases in the soil is affected by the void distribution characteristic of the soil. Accordingly, when the soil moisture content is increased, voids in the soil are filled by the excessive moisture content (and the number of voids in the soil, naturally, decrease), the oxygen concentration in the soil decreases, and at the same time the carbon dioxide concentration in the soil suddenly increases, inhibiting plant growth. In particular, when voids in the soil are temporarily blocked up and the moisture content therein is stagnant at the time of irrigation, the oxygen in the soil is decreased, risking damage to the roots. It is believed that plant growth is also inhibited by high-concentration carbon dioxide, since such carbon dioxide is dissolved in the soil moisture, thereby decreasing the pH thereof. As described above, the gaseous environment condition in the soil is closely related to the soil moisture conditions.

Also as described above, in order to control the environmental conditions for facilitating good growth of plants or seedlings in conventional production facilities for producing useful plants and crops, expensive facilities and equipment are required, resulting in high running costs. Further, when conventional techniques are used, it has proven to be difficult to simultaneously achieve an optimum gaseous environment and optimum moisture environment in the soil.

DISCLOSURE OF INVENTION

An object of the present invention is to provide a plant-cultivating container and a plant-cultivating method which solve the above-mentioned problems encountered in the prior art.

Another object of the present invention is to provide a plant-cultivating container and a plant-cultivating method facilitating "moisture content control", which is particularly important for the control of the gaseous environment and moisture environment in soil.

A further object of the present invention is to provide a plant-cultivating container and a plant-cultivating method which can simultaneously control the gaseous environment and moisture environment in soil (while these could not be solved simultaneously by the conventional cultivation of plants or seedlings in the prior art) so as to reduce the costs for facilities and equipment required for cultivating plants or seedlings.

As a result of intensive study, the present inventors have found that the above objects can be achieved extremely effectively by imparting to a container a "selective moisture-vapor permeability" which allows humidity to pass through the container without allowing water per se to pass through, instead of using a conventional plant-cultivating container which does not allow water or humidity to pass through it (or a conventional plant-cultivating container which allows both water and humidity to pass through).

The plant-cultivating container according to the present invention is based on the above discovery, and more specifically, is a plant-cultivating container having a receiving portion for receiving a plant body; the container having, as at least a portion thereof, a selective moisture vapor-permeable portion which prevents water from passing through the container, but allows water vapor to pass through.

The present invention also provides a plant-cultivating method, comprising:

providing a plant-cultivating container having a receiving portion for receiving a plant body; the container having, as at least a portion thereof, a selective moisture vapor-permeable portion which prevents water from passing through the container, but allows water vapor to pass through;

disposing a plant body-retaining support and a plant body in the container; and cultivating the plant body while enabling at least the selective moisture vapor-permeable portion to be in contact with water.

At least a part of the plant-cultivating container according to the present invention having the above-mentioned structure is imparted with "selective moisture-vapor permeability", which prevents water per se from passing through the moisture-permeable portion, but allows water vapor to pass through. Accordingly, when such a container comes into contact with water, water per se does not pass into the container through the moisture vapor-permeable portion, but water vapor can pass into the container therethrough. As a result, the relative humidity in the container can be increased to a degree which contributes to growth of the plant in the container, without decreasing the concentration of useful gas(es) in the soil in the container.

In the present invention, on the basis of the above-mentioned selective passage of water vapor into the container, the frequency of supply and/or amount of "water" per se to be supplied to a plant by a measure such as irrigation can be, at least, reduced markedly.

In addition, in the present invention, the moisture content which is necessary for cultivation of a plant is supplied in the form of "water vapor" through the selective moisture vapor-permeable portion as described above, and therefore it is possible to use water as the source of water vapor, irrespective of the quality of the water. In other words, in the present invention, it is possible to utilize water which was hitherto difficult to use in conventional cultivation methods, such as salt water (seawater, etc.), hard water, soft water, and waste water.

Figure 1:
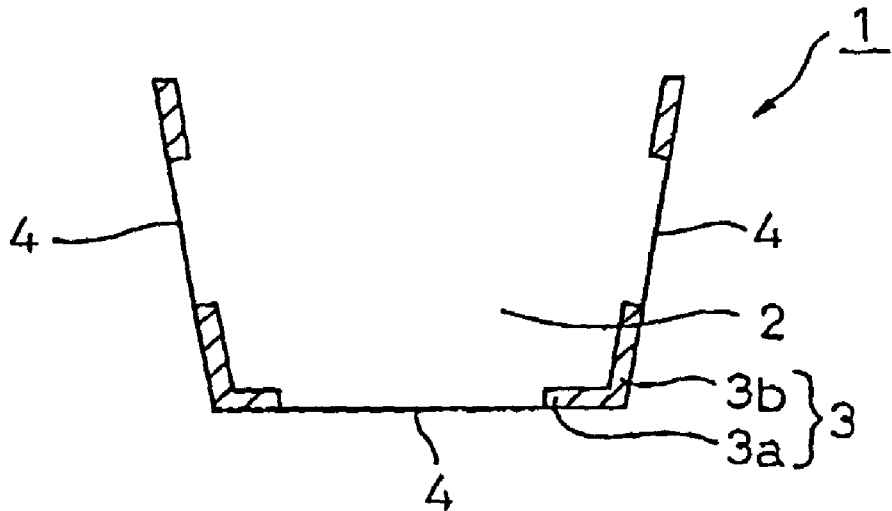
FIG. 1 is a schematic sectional view showing a basic embodiment of the plant-cultivating container according to the present invention.

In the respective drawings as described above, the reference numerals denote the following elements.

1 . . . plant-cultivating container, 2 . . . plant-receiving portion, 3 . . . wall material, 3$a$ . . . bottom face, 3$b$ . . . side wall, 4 . . . selective moisture vapor-permeable portion, 5 . . . plant, 6 . . . support, 7 . . . water, and 8 . . . pool bench.

BEST MODE FOR CARRYING OUT THE INVENTION

Hereafter, the present invention will be described in further detail with reference to the accompanying drawings, as appropriate. In the following description, "%" and "part(s)" representing quantitative proportions or ratios are those based on mass (or weight), unless otherwise noted specifically.

(Plant-cultivating Container)

The plant-cultivating container according to the present invention is a container which has a receiving portion for receiving a plant body, and has, as at least a portion thereof, a moisture vapor-permeable portion having "selective moisture-vapor permeability", which is water-impermeable but is moisture vapor-permeable (preferably, one having a moisture vapor permeability of $1 \times 10^3$ g/(m$^2$·24 hours) or more).

Referring to FIG. 1 showing a basic embodiment of the above container, the container 1 of this embodiment comprises a wall material 3 for providing (or defining) a receiving portion 2 for receiving a plant body, and a moisture vapor-permeable portion 4 disposed in a part of the wall material 3. The moisture vapor-permeable portion 4 has "selective moisture-vapor permeability" which prevents water per se from passing through the moisture vapor-permeable portion 4, but allows water vapor to pass through.

As shown in FIG. 1, the moisture vapor-permeable portions 4 are provided in the bottom portion 3a and the side face 3b constituting the wall material 3. However, in the present invention, it is sufficient that at least one moisture vapor-permeable portion 4 be provided on any part of the wall material 3. In addition, the entirety of the wall material 3 can be the "moisture vapor-permeable portion", if necessary. More specifically, the entirety of a known cultivating container among those which have heretofore been used (such as pot-type, tray-type and planter-type cultivating containers) can also be converted into the above-mentioned moisture vapor-permeable portion 4.

It is preferable to provide the moisture vapor-permeable portion 4 in the side face 3b (rather than in the bottom portion 3a) in vies of the provision of a larger contact surface area of the moisture vapor-permeable portion 4 with water.

(Container, Receiving Portion and Wall Material)

The shape, size, etc., of the container 1 are not particularly limited. For example, it is possible to utilize as such, the shape, size, etc., of known cultivating containers among those which have heretofore been used (such as pot-type, tray-type, and planter-type cultivating containers).

In addition, the shape, size of the receiving portion 2 of the container 1, or the material, thickness, etc., of the wall material 3 for providing such a receiving portion are not particularly limited. These items can appropriately be selected and in consideration of various kinds of conditions, such as water consumption amount of a plant which is to be grown, the internal volume of the container, the permeability of a support for the plant (such as soil), and the temperature of water.

As the material for the wall material 3, it is possible to suitably use, e.g., general-purpose plastics such as polypropylene, polyvinyl chloride, and polyethylene in view of weight reduction, ease of moldability, and cost reduction.

(Moisture Vapor-permeable Portion)

The above-mentioned moisture vapor-permeable portion 4 is constituted by a material having "selective moisture-vapor permeability" which prevents water from passing through the portion 4, but allows water vapor to pass through. In the present invention, it is possible to confirm that the material constituting the moisture vapor-permeable portion 4 is "water-impermeable" and that it is water vapor-permeable, e.g., by the following methods.

<Method of Confirming Water-impermeability>

In the present invention, the phrase "the moisture vapor-permeable portion is water-impermeable" means that the "water pressure resistance (or tightness)" of the moisture vapor-permeable portion is about 30 cm or more. This "water pressure resistance" can be measured in accordance with JIS-L-1092 (Method B). In the present invention, the water pressure resistance may preferably be 50 cm or more, more preferably 1 m or more (particularly, 2 m or more).

<Method of Measuring Moisture Vapor Permeability>

The above-mentioned moisture vapor permeability of the moisture vapor-permeable portion can be measured in accordance with JIS-Z-0208 (Method of testing moisture vapor permeability of moisture vapor-proof packaging materials; "Cup Method").

In the measurement of the moisture vapor permeability by the above-mentioned Cup Method, a test piece (comprising the material constituting a moisture vapor-permeable portion, usually in the form of a selective moisture vapor-permeable portion) having a circular shape which is about 10 mm or more larger than the inside diameter of a moisture vapor-permeability measuring cup as defined in the above-mentioned JIS standard, is mounted on the moisture vapor-permeability measuring cup containing therein a moisture absorbent (calcium chloride), and the periphery of the test piece is sealed with a predetermined sealant. At a temperature of 25° C. (or 40° C.), by use of the above-mentioned test piece as a boundary surface, the increase in the weight of the above-mentioned cup is measured at appropriate intervals (at intervals of 24 hours, 48 hours or 96 hours) under conditions such as where one side of the above-mentioned boundary surface is caused to have a relative humidity of 90% or more, and the other side thereof is caused to be of a dry state on the basis of the above-mentioned moisture absorbent. This measurement is continued until the increase in the above-mentioned cup weight becomes constant within a variation of 5% or less On the basis of the results of such a test, the moisture vapor permeability is determined according to the following formula. Such a measurement is conducted at least ten times, and the arithmetical mean value thereof is determined from these measurements.

$$\text{Moisture vapor permeability (g/m}^2\cdot\text{24 hours)} = (240 \times m)/(t \cdot s)$$

s: moisture vapor-permeable area (cm$^2$)

t: total length (h (hours)) of the interval time for the last mass measurement which has been conducted for the test; and m: total of mass increase (mg) in the interval time for the last mass measurement which has been conducted for the test.

The above-mentioned moisture vapor permeability is usually $1 \times 10^3$ g/(m$^2$·24 hours) or more, preferably $2 \times 10^3$ g/(m$^2$·24 hours) or more, particularly $5 \times 10^3$ g/(m$^2$·24 hours) or more, more preferably $10 \times 10^3$ g/(m$^2$·24 hours) or more, while the above moisture vapor permeability may change somewhat, depending on the amount of water consumption of the plant to be grown, the internal volume of the container, the permeability of soil, the area of the selective moisture vapor-permeable portion, the temperature of water, etc.

(Moisture Vapor-permeable Material)

The moisture vapor permeable material usable for the container according to the present invention is not particularly limited, as long as it satisfies the above-mentioned requirement of selective moisture-vapor permeability which is water-impermeable and allows water vapor to pass through the material, but it is possible to use one which is appropriately selected from known materials. Such a material can usually be used in the form of a film or membrane.

The materials which have heretofore been developed and prevent water in the form of a liquid from passing through the material, but allow water vapor to selectively pass through the material can be classified into two kinds inclusive of porous materials and non-porous materials. In the present invention, any of these kinds of materials can be used.

The first kind (porous material) of these materials may include, e.g., a film or membrane obtained in which a polymer having high hydrophobicity has fine pores. As these materials, it is possible to use, e.g., a polymer having high hydrophobicity such as polypropylene, polyethylene, polytetrafluoroethylene, and polyester. As the method of forming fine pores in the polymer, it is possible to use a method wherein an inorganic filler is melt-kneaded into a polymer so as to form a sheet, and then the inorganic filler is removed from the resultant sheet by elution; or a method wherein a polymer is uniaxially or biaxially stretched.

In addition, the porous film or membrane can also be formed by a method wherein a sheet of the above-mentioned polymer is rapidly cold-stretched so as to convert the polymer into a fibril form without adding a filler to the polymer, whereby the polymer sheet formed has fine pores. In the thus-prepared fine pore-imparted film or membrane, fine pores are formed through which liquid water cannot pass due to the water repellency of the polymer material, and only water vapor can pass through the film or membrane.

As the second (non-porous) kind of moisture vapor-permeable material, it is possible to use, e.g., polyvinyl alcohol, cellophane, cellulose acetate, cellulose nitrate, ethyl cellulose, silicone rubber, polyester, neoprene, polyethyl methacrylate, polystyrene, and copolymers comprising a monomer constituting the above-mentioned polymer, etc., as the moisture vapor-permeable material according to the present invention. The moisture vapor-permeability of a film or membrane of a hydrophilic polymer such as the above-mentioned polyvinyl alcohol and various kinds of celluloses can be exhibited on the basis of penetration-vaporization phenomenon of water.

The thickness of the moisture vapor-permeable portion according to the present invention is preferably about 1 µm to 500 µm more preferably about 10 µm to 200 µm (0.01 mm–0.2 mm), while it can be somewhat varied depending on the strength, water pressure resistance of the material constituting the moisture vapor-permeable portion and on the desired moisture vapor-permeability thereof.

The container according to the present invention can be entirely constituted by using a material having the above-mentioned selective moisture vapor-permeability, but it is also possible to constitute a part(s) of the container by using a suitable material having the above-mentioned selective moisture vapor-permeability, in consideration of the strength, shaping property, cost, etc., of such a material. In the latter case, the surface area of the moisture vapor-permeable portion may usually be 20% or more, more preferably 40% or more, particularly 80% or more, in terms of the proportion of the surface area of the moisture vapor-permeable portion to the total surface area of the outside surface of the container (the side of the container in contact with water), while the surface area of the selective moisture vapor-permeable portion can be adjusted depending on the water consumption of a plant to be grown, the internal volume of the container, the gas permeability of soil, and the temperature of water, etc.

Further, it is possible to form a composite of the selective moisture vapor-permeable portion with "another material", as desired, for the purpose of reinforcing the strength, improving the ease in handling thereof, and improving the shape-retaining property of the selective moisture vapor-permeable portion 4 according to the present invention. Examples of the "other material" may include, e.g., nonwoven fabric comprising polyethylene, polypropylene, polyethylene terephthalate, polyamide, etc. Examples of the technique for forming such a composite may include, e.g., bonding or laminating, and formation of double-wall containers.

Further, as described hereinafter, in consideration of the mechanical strength of the selective moisture vapor-permeable portion 4, its outside may be covered with another material having water permeability. It is possible to dispose the "other material" in contact (including partial contact) with the moisture vapor-permeable portion 4, or to dispose them with a gap or space therebetween, as desired. Examples of the above material may include relatively hard materials such as metal, plastic, ceramic, and wood.

(Method of Forming Container)

The method of forming the plant-cultivating container according to the present invention is not particularly limited. More specifically, the container may, for example, be formed by substituting a portion of one of the known cultivating containers which have heretofore been used, with a selective moisture vapor-permeable portion 4 as described above.

It is also possible to form the container by disposing a selective moisture vapor-permeable portion 4 as described above, in the inside of a basket- or cage-type container comprising a mesh of plastic or metal. In such an embodiment, it is easy to supplement the mechanical strength of the selective moisture vapor-permeable portion 4.

(Cultivation Method)

The method of using a plant-cultivating container having the above-mentioned structure is not particularly limited. For example, it is possible for a plant-retaining support and a plant body to be disposed in the above-mentioned container, and the plant body cultivated while at least the moisture vapor-permeable portion is in contact with water.

(Plant-retaining Support)

In the present invention, it is possible to use one of a range of known supports as a plant-retaining support without particular limitation. Examples of such a support may include, e.g., soils (such as gravel, sand, and soil); carbide, natural mineral substances (such as vermiculite, perlite, and zeolite), natural plant substances (such as peat moss, bark, sphagnum moss, and crushed coconut shell), plant-growing water-retaining agent, and seedling (or young plant)-growing planting material obtained by compounding these materials.

(Passage of Water Into Container)

When the container according to the present invention is in contact with water, water vapor can pass into the container substantially selectively through the above-mentioned moisture vapor-permeable portion, but water per se cannot pass into the container. As a result, the relative humidity in the soil gas disposed in the container is increased. In general, the following relationship is observed between the relative humidity of soil gas ($P/P_0$) and the water potential ($\psi$) per unit mass in the soil:

$$\psi = RT/M \cdot ln(P/P_0)$$

wherein R is the gas constant, T is the absolute temperature, and M is the molar mass of water.

When the relative humidity in the soil is increased, the water potential in the soil ($\psi$) is also increased accordingly. The following relationship is observed between the water potential ($\psi$) and the pF value of soil moisture:

$$pF=\log_{10}(-\psi/[\text{cm H}_2\text{O}]).$$

As the water potential is increased, the pF value is decreased. In general, the pF value of water which is available for a plant is considered to be in the range of 1.5-2.5. It is usually considered that when the pF value exceeds 3, such a value corresponds to the amount of water inhibiting growth of a plant. The relative humidity of the soil gas at which a plant can be grown (i.e., the relative humidity corresponding to a pF value of 3 or less) may usually be 99% or more.

For the above-mentioned reasons, it is supported that when the relative humidity of soil gas is enhanced in order to maintain the water potential enabling the growth of a plant, the plant can be cultivated while the need to directly supply water in the form of a liquid into the soil (i.e., as the water supply in the plant-cultivating method which has heretofore been conducted) is entirely eliminated, or the frequency of irrigation is reduced to a very small value, and, correspondingly, the amount of water for the irrigation. According to the plant-cultivating method of the present invention, it is possible to enhance the relative humidity of soil gas by allowing water vapor to selectively pass through the wall of the plant body-cultivating container in contact with water, while preventing water in the form of a liquid to pass through. Therefore, according to the present invention, it is possible to at least reduce markedly the amount of water in the form of liquid, and/or the frequency of direct water supply into the soil by irrigation, etc.

(Control of Water Temperature)

In the present invention, the temperature of a support (such as soil) for the plant in the container, i.e. the temperature of the rhizosphere for the plant can be regulated by controlling the temperature of water in contact with the plant-cultivating container, as desired. According to such an embodiment, it is possible to control the temperature of the rhizosphere for the plant in a more precise manner as well as in a more energy-saving manner, as compared with those in the conventional method wherein the entire space of a greenhouse is heated or cooled.

(Conventional Temperature Control)

For the purpose of comparing with the temperature-controlling method according to the present invention, a conventional temperature controlling method will now be described.

Examples of a conventional heating method (in a greenhouse) include the warm-air heating method, hot-water heating method and steam heating method. However, all of these methods involve heating of the entire room, and therefore are lower in efficiency, and higher in production costs, than partial heating of the rhizosphere region, which is necessary for promoting growth in the most effective manner.

Other conventional cooling methods (in a greenhouse) include the air-cooled air-conditioning method, water-vaporization cooling (evaporation cooling) method, and heat-pump method. However, all of these methods have a drawback in that they require substantial amounts of equipment, the running costs thereof in the summer are particularly high, even compared with heating costs in the winter.

(Rhizosphere Temperature)

In general, growth failure of most useful plants tends to occur when the rhizosphere temperature is below 15° C. or exceeds 25° C. Accordingly, it is particularly preferred to regulate the rhizosphere temperature to remain in the range of 15-25° C. Although the rhizosphere temperature is influenced by the air temperature to a certain extent, it is considered that the width of change of rhizosphere temperature in the course of a day is smaller than that of the air temperature, and the highest value and the lowest value in the rhizosphere temperature usually appear at a point of time which is a few hours later than the highest value and the lowest value in the air temperature, respectively. When the air temperature and the rhizosphere temperature are both low, such as in the winter, it has been reported that the yield of tomatoes is noticeably increased by selectively elevating the rhizosphere temperature thereof to a preferred value (Handbook of Environment Control in Biology (SEIBUTSU KANKYO CHOSETSU HANDBOOK), edited by Japanese Society of Environment Control in Biology, published by Yokendo Co., Ltd., P441, 1995). On the other hand, when the air temperature is high, such as in the summer, it has been reported that the yield of tomatoes is greatly increased by selectively cooling the rhizosphere temperature thereof (in the above-mentioned Handbook of Environment Control in Biology, on the same page).

As a result of investigations by the present inventors, it has been found that the influence of the rhizosphere temperature is larger than the influence of air temperature on the growth of a plant. As described above, in conventional plant (or seedling)-producing facilities, the air temperature of the entirety of the greenhouse is controlled by air-conditioning equipment, and such a system has a major drawback in that the cost of the air-conditioning equipment, the costs of building the greenhouse, and running costs are high.

In contrast, in an embodiment of the present invention wherein the temperature of water in contact with the moisture vapor-permeable portion is selectively controlled, the temperature of water in contact with the plant-cultivating container is directly regulated instead of regulating the air temperature, to thereby maintain the rhizosphere temperature in a suitable range. Such control of the rhizosphere temperature promotes the growth of the roots of a plant. Accordingly, the absorption of nutrients by the plant is promoted, as is growth of the entire plant body, thereby improving productivity. As a result, plants can be cultivated substantially at much lower costs because of the improvement in productivity, and because of the air temperature control by a temperature-maintaining apparatus for a water tank which is inexpensive both in its production running costs.

In addition, water is superior to air as a heat-conducting medium, and therefore local temperature control by regulating the temperature of water directly in contact with the container can provide more precise temperature control and much smaller loss of heat as compared with regulation of the rhizosphere temperature by controlling the temperature of an entire greenhouse.

Further, the present invention can also provide an advantage in that it is possible to locate together in a given place a plurality of water tanks respectively corresponding to plural species of plant having different suitable rhizosphere temperatures, even if these plural species of plant are placed in the same interior of a room. In contrast, in a greenhouse using the conventional temperature control system, it is difficult to precisely control the rhizosphere temperature, and it is difficult to simultaneously cultivate together different species of plant having different suitable rhizosphere temperatures as described above.

Even when a cell-type sheet or a cell-type tray made of a general-purpose plastic (as a conventional plant-cultivating container) is used, it is possible to control the water temperature so as to regulate the rhizosphere temperature by directly immersing these conventional sheets or trays in water tanks.

However, as described above, these containers have an aperture in the bottom face of the cells constituting the container so as to prevent the retention of excessive water due to irrigation (i.e., gravitational water having a pF value of about 1.5 or less) and to prevent a deleterious change in the gaseous environment in the soil and root rot due to bacteria propagation. Therefore, it is substantially difficult to immerse the conventional container in a water tank for a long time, so as to regulate the rhizosphere temperature.

In contrast, according to the cultivation method of the present invention, moisture vapor is supplied to a plant body (in the form of water vapor) through the selective moisture vapor-permeable portion which is in contact with water, and therefore the plant-cultivating container can be immersed in a water tank for a long time so as to regulate the rhizosphere temperature while preventing root rot due to bacteria propagation and deleterious change in the gaseous environment in the soil. In the present invention, it is presumed that the soil moisture environment is principally controlled by water vapor passing through the selective moisture vapor-permeable portion (such as a film or membrane) in direct contact with water, and water in the form of a retention liquid which can adversely affect the soil moisture environment, is essentially not used, to thereby provide a rhizosphere environment which is approximate to an ideal environment.

(Supply of Water)

As described above, in the cultivation method according to the present invention, most of the water supply to a plant body is conducted by utilizing water vapor passing through the selective moisture vapor-permeable portion which is in contact with water, and there is used a system which is utterly different from the conventional cultivation method, the principal purpose of which is to supply water in the form of a liquid. Therefore, according to the present invention, it is possible to markedly reduce the burden on conventional expensive irrigation equipment or facilities, as well as to markedly reduce the frequency of damage due to occurrence of disease, which is a major problem associated with the sprinkling method, etc. Further, in the conventional irrigation method, irrigation is conducted artificially and intermittently, and therefore states of lack and of excessive soil moisture alternately occur. Such occurrences of water stress tend to weaken the normal growth of a plant, and its resistance to illness. In the plant-cultivating soil which is to be used on condition that wet and dry states are alternately provided, the amount of oxygen in the soil is increased in the dry state, and the soil actively absorbs plant nutrients as an energy source of roots. In this state, however, plant nutrients, which are present in ionic form, are less likely to be absorbed by the plant due to insufficient soil humidity based on the dry state thereof. On the other hand, when the soil moisture is in a saturated state, plant nutrients are more likely to be absorbed by the plant, but the saturated water in the soil invites an oxygen-deficient state of the soil, and the energy which is required for the activity of absorbing in the root is decreased or becomes insufficient. In order for a plant to favorably absorb the plant nutrients present in the planting material, the presence of both suitable effective soil gas and soil moisture is important.

The supply of water vapor through the selective moisture vapor-permeable portion according to the present invention can be conducted automatically and continuously in response to a decrease in the relative humidity of soil gas, i.e. deficiency in the soil moisture content. In such a manner, the amount of irrigation water and/or the frequency of irrigation which provide the water stress can markedly be reduced, whereby the water-deficiency and the water-excess states which inhibit plant growth can be dramatically reduced. As described above, the water-excess state arising from use of the conventional irrigation method blocks voids in the soil, causing a deleterious change of gaseous environment in the soil and abnormal propagation of soil microbes. However, when the container or method according to the present invention is used, these adverse influences are reduced dramatically.

In addition, in some cases, excessive moisture in the soil can degrade the quality of crops (e.g., decrease in the sugar content of fruits). The container and method according to the present invention are also useful in terms of marked reduction in excessive water, and it is expected that these container and method according to the present invention can enhance the contents of active ingredients such as nutrients of vegetables (such as saccharides, various minerals, and vitamins) and active ingredients of herbs.

(Other Water-supplying Method)

In the plant-cultivating method according to the present invention, moisture vapor is supplied to a plant body by water vapor passing through the above-mentioned selective moisture vapor-permeable portion. However, it is also possible to use this method in combination with a conventional irrigation method such as earth surface sprinkling method, and the drip irrigation method, as desired, in order to supplement the moisture supply in view of the amount thereof or the ingredient therein (such as plant nutrients and minerals). Even in this case, it is possible to minimize the use of such a conventional water-supplying method in combination with the above-mentioned method (e.g., about one occurrence per month).

(Other Embodiments of Cultivation Method)

In the plant body-cultivating method according to the present invention, a plant can be cultivated while the selective moisture vapor-permeable portion of the plant-cultivating container is in direct contact with water, such as water in a water tank.

In the cultivation method according to the present invention, as described above, the temperature of water in contact with the moisture vapor-permeable portion may be controlled as desired. According to such an embodiment, a plant body can be favorably grown without controlling the temperature of the entirety of environment (such as the entire space of a greenhouse) surrounding the plant body, as in the conventional method.

In the cultivation method according to the present invention, it is also possible to use a method wherein a water tank is caused to have a sealing structure in order to prevent transpiration of water from the tank, or the surface of water is covered with a non-volatile substance, etc. In addition, it is possible to adopt a method wherein the wall of a water tank is covered with a heat-insulating coating material in order to prevent passage of heat from the water tank wall.

Further, it is possible to add various kinds of antibacterial agents into water in a water tank in order to prevent corruption of the water contained in it. Even in this case, an antibacterial agent added to the water will not pass through the selective moisture vapor-permeable portion according to the present invention, since it is water-impermeable and moisture vapor-permeable, and therefore the antibacterial agent will not pass into the cultivation container adversely affect the growth of the plant body.

In addition, the moisture vapor which is necessary for cultivation according to the present invention is supplied as water vapor passing through the selective moisture vapor-permeable portion, and therefore the quality of the water per se as a source for supplying water vapor is not particularly limited. In other words, it is possible to use any kind of water (such as seawater, hard water, soft water, and polluted water) for the cultivation method according to the present invention, regardless of the quality thereof.

(Example of Practical Cultivation Method)

Figure 2:
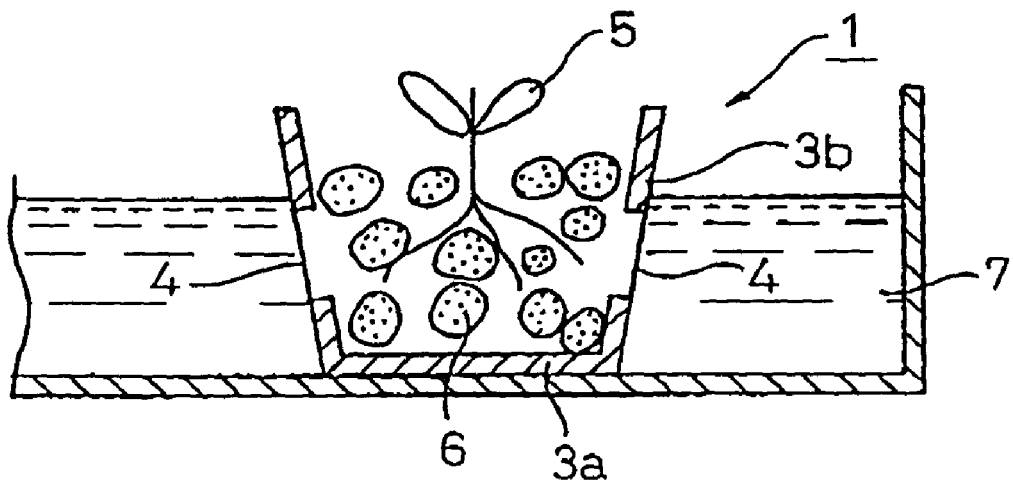
FIG. 2 is a schematic sectional view showing an example of an embodiment wherein a plant-cultivating container according to the present invention is immersed in water.

FIG. 2 is a schematic sectional view showing an example of the cultivation method according to the present invention, showing a pot having a "single" plant-receiving portion.

Referring to FIG. 2, in a plant-cultivating container 1 according to the present invention, a support 6 for supporting a plant body 5 is provided. The container 1 is entirely immersed in water 7. The selective moisture vapor-permeable portion 4 constituting the container 1 prevents water per se from passing through, but allows water vapor to pass through, to supply moisture to the inside of the container 1 by the passage of the water vapor through the moisture vapor-permeable portion 4.

From the viewpoint of having as large a contact surface area of the moisture vapor-permeable portion 4 with water 7 as possible, it is desirable that the container 1 be sufficiently immersed in water 7. From such a viewpoint, it is desirable that the weight of the contents of the container 1 be as heavy as possible by disposing an object or material (such as stone) as a "weight" in the container 1.

Figure 3:
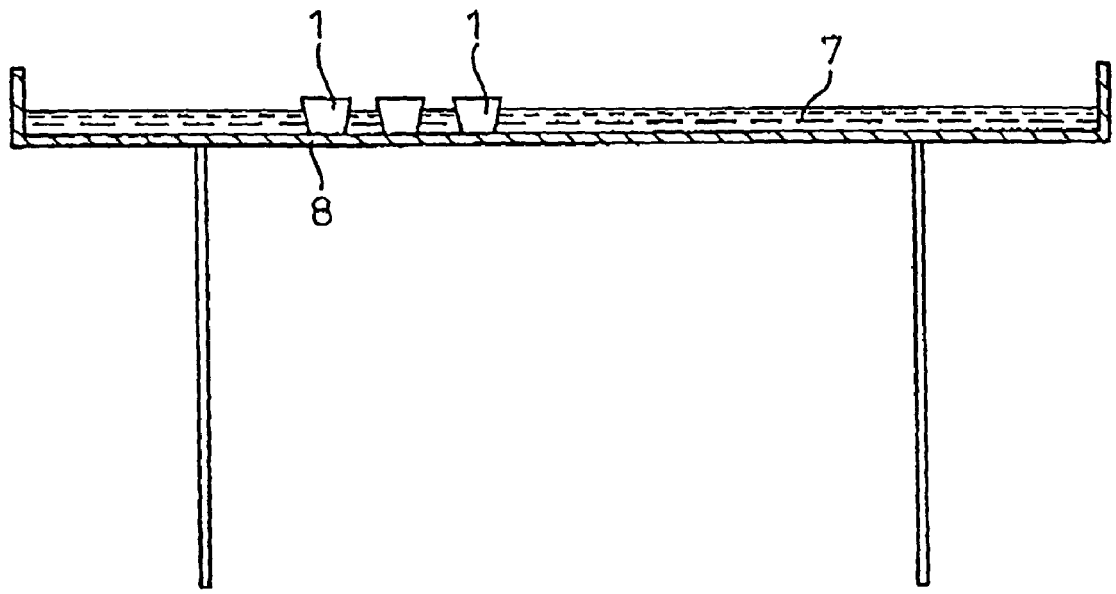
FIG. 3 is another example of an embodiment wherein a plant-cultivating container according to the present invention is immersed in water.

When the container 1 as shown in FIG. 2 is used, for example, it is possible that water 7 is placed in a mount 8 (such as a so-called "pool bench" or "water pool") equipped with a suitable water tank, as shown in the schematic sectional view of FIG. 3, and that the container 1 be placed in such a mount.

Figure 4:
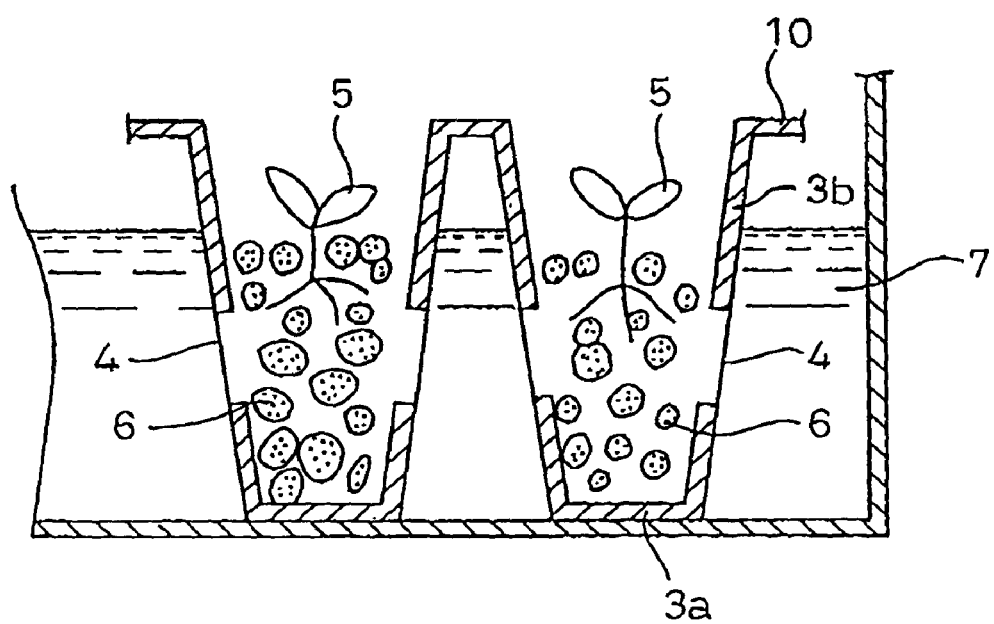
FIG. 4 is a schematic sectional view showing an example of an embodiment wherein a plant-cultivating container according to the present invention is immersed in water.
Figure 5:
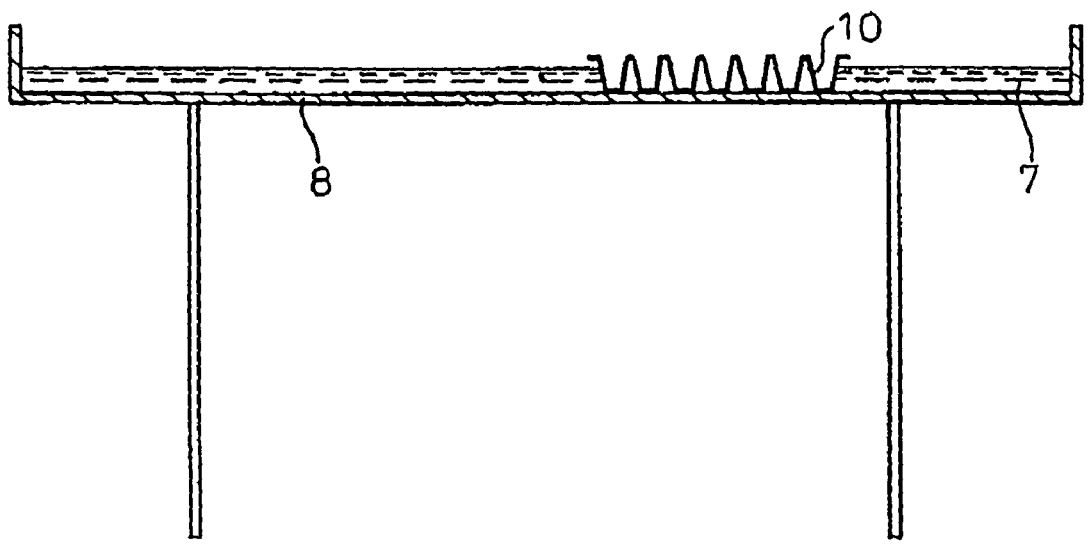
FIG. 5 is another example of an embodiment wherein a plant-cultivating container according to the present invention is immersed in water.

FIGS. 4 and 5 are schematic sectional views showing a structure which is the same as those in FIGS. 2 and 3, respectively, except that a "cell tray" 10 having a plurality of receiving portions is used instead of the single pot 1 used in FIGS. 2 and 3.

(Other Embodiments of Plant-cultivating Container)

As described above, it is sufficient that the plant-cultivating container 1 according to the present invention have, as at least a portion thereof, a selective moisture vapor-permeable portion 4 which is water-impermeable but is moisture vapor-permeable. Accordingly, it is possible, if desired, for the entire container 1 to be comprised of the selective moisture vapor-permeable portion 4 which is water-impermeable.

Figure 6:
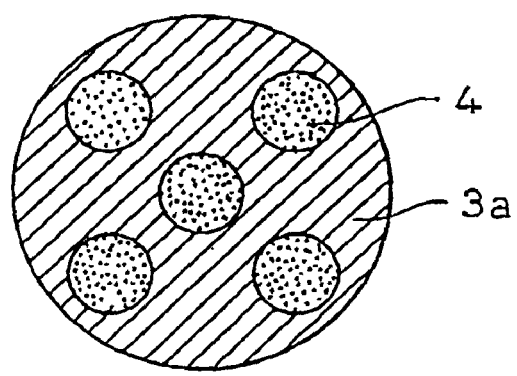
FIG. 6 is a schematic plan view showing another example of the bottom face constituting the plant-cultivating container according to the present invention.
Figure 7:
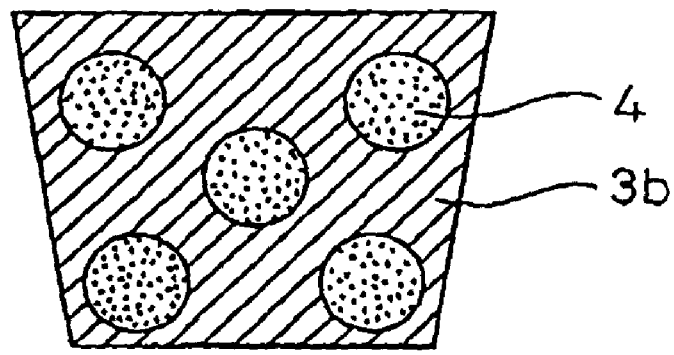
FIG. 7 is a schematic plan view showing another example of the side face constituting the plant-cultivating container according to the present invention.

In the container according to the present invention, the selective moisture vapor-permeable portion 4 may be provided as a single portion, as a plurality of such portions, as desired. For example, it is possible to provide two or more moisture vapor-permeable portions 4 in the bottom face portion 3a of the container 1, as shown in the schematic plan view of FIG. 6, or two or more moisture vapor-permeable portions 4 in the side face portion 3b of the container 1, as shown in the schematic side view of FIG. 7. The method of disposing the plural moisture vapor-permeable portions 4 is not particularly limited. For example, it is possible to dispose the plural moisture vapor-permeable portions 4 in an arbitrary manner, such as in the form of a "Go-board" (or checkerboard) pattern, in the form of an "Ichimatsu" (or checks) or checker-type pattern, in the form of a step-type pattern, etc. Provision of plural moisture vapor-permeable portions 4 has a merit in that it is possible to adopt a cultivation method which is suitable for any of various species of plants.

Figure 8:
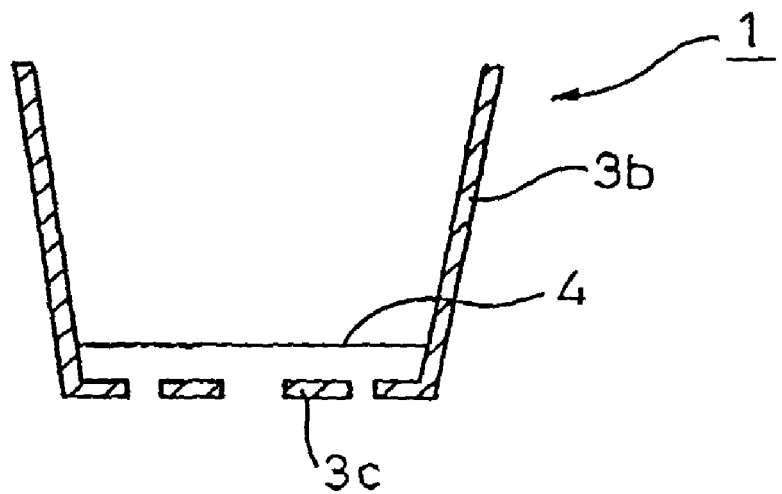
FIG. 8 is a schematic sectional view showing another embodiment of the plant-cultivating container according to the present invention.

In the above-mentioned embodiment of FIG. 1, a portion of the bottom 3a/side face 3b of the container 1 is substituted with the moisture vapor-permeable portion 4, but as shown in the schematic sectional view of FIG. 8, it is also possible to dispose the moisture vapor-permeable portion 4 separately from the (perforated) bottom 3c (and/or side 3b). When the moisture vapor-permeable portion 4 is provided separately from the bottom 3a (and/or side 3b) in the above-mentioned manner, damage to the moisture vapor-permeable portion 4 can effectively be prevented, even when a stress such as an external force is applied to the bottom 3a (and/or side 3b). Therefore, according to such an embodiment, it is possible to markedly decrease the risk of the moisture vapor-permeable portion 4 being damaged or even destroyed (for example, when a hole forms in a portion thereof), thereby causing water per se to flow into the container 1.

EXAMPLES

Hereinbelow, the present invention will be described more specifically with reference to Examples.

Example 1

As a selective moisture vapor-permeable film which was water-impermeable, a microporous polypropylene film having a moisture vapor-permeability of about 8,500 g/(m$^2$·24 hours) (mfd. by Tokuyama CO., LTD., thickness 75 μm) was used. This film was disposed inside a cylindrical container made of stainless steel mesh (thickness 0.1 mm, mesh size about 7 mm, internal volume of container: about 31 ml) so as that the film entirely contact the inside of the container, about 25 ml of soil (from Enzan-shi, Yamanashi prefecture, Japan) was poured into the inside of the moisture vapor-permeable film, and then three basil seedlings having a height of about 4 cm were transplanted in the soil in the container.

The thus-prepared cultivating container was immersed in a water tank filled with tap water (to a water depth of 3.5 cm) which had been regulated to about 25° C., and cultivation of the seedlings was conducted. As a result, all of the three basil seedlings were continuously successfully grown for four months or more without direct supply of water by irrigation to the soil. In other words, in this Example, it was demonstrated that a plant body can be cultivated and grown simply by using water vapor passing through the moisture vapor-permeable film.

Reference Example 1

Basil seedlings were cultivated in the same manner as in Example 1, except that a film of soft polyvinyl chloride (having a moisture vapor-permeability of about 400 g/(m$^2$·24 hours); thickness 50 μm) was used instead of the selective moisture vapor-permeable film used in Example 1.

More specifically, the soft polyvinyl chloride film was inserted inside the stainless steel mesh container used in Example 1, and three basil seedlings having a height of about 4 cm were transplanted in the soil, and the container was immersed in the water tank which filled with tap water, whereby the cultivation experiment was conducted in the same manner as in Example 1.

As a result, when water was directly supplied to the soil by irrigation at an interval of one time per three days, the basil seedlings showed growth to a certain extent. On the other hand, when water was not supplied directly to the soil by irrigation, the three basil seedlings withered in about one week.

Example 2

About 100 ml of soil (Sakata small seedling-cultivating soil, Super-Mix) into which sweet alyssum of Brassicaceae annual plant had been planted, was wrapped with a microporous polypropylene film (mfd. by Tokuyama Co., Ltd., thickness 75 μm, diameter 5 cm×5 cm, depth 5 cm) having a moisture vapor-permeability of about 8,500 g/(m$^2$·24 hours), as a selective moisture vapor-permeable film which was water-impermeable, the resultant wrapping was secured by using a binding wire for inducing flower stalk, and the soil was immersed in a water tank filled with underground water to a water depth of 3 cm, which had been regulated to about 20° C., and cultivation of the sweet alyssum was conducted.

The cultivation environment was as follows: in an is acrylic resin-covered greenhouse, the cultivation temperature was 15° C. at night, and 25° C. during the day, illumination was 4×10$^4$ Lux (during fine weather, 11:30 a.m. to 2:00 p.m.). Cultivation was conducted without any water being supplied to the sweet alyssum.

In this cultivation, the sweet alyssum was grown continuously and successfully for three months or more. When the moisture vapor-permeable film was taken off one week later after the one-month cultivation period, it was observed that the soil corresponding to the water-immersed portion was wet, and the sweet alyssum showed a good density of the roots.

Comparative Example 2

Sweet alyssum was cultivated in the same manner as in Example 2 for one month in the same manner as in Example 2, without any water being supplied, except that the same soil was transplanted into an agricultural plant-cultivating pot made of water vapor-impermeable polyethylene (diameter of 6 cm×6 cm, depth 5 cm, wall thickness 0.75 mm) which was used instead of the selective moisture vapor-permeable film used in Example 2. In the case of this cultivation, the sweet alyssum withered in about 1 week.

Example 3

The pot was removed from a 12 cm pot containing Pieris (ASEBI), white-blossom *Pieris japonicum* (mfd. by Kaneya Sangyo Co.) which had been cultivated as a flowering tree for gardening, and the cultivation soil portion was wrapped with a microporous polypropylene film (mfd. by Tokuyama Co., Ltd., thickness 75 μm, diameter 12 cm×12 cm, depth 8 cm) having a moisture vapor-permeability of about 8,500 g/(m$^2$·24 hours), as a selective moisture vapor-permeable film, the resultant wrapping was secured by using a binding wire for inducing flower stalk, and the soil was immersed in a water tank filled with underground water to a depth of 8 cm, which had been regulated to about 20° C., and cultivation of the Japanese andromeda was conducted. The cultivation environment was as follows: in an acrylic resin-covered greenhouse, the cultivation temperature was 15° C. at night, and 25° C. during the day, illumination was 40,000 Lux (during fine weather, 11 a.m. to 2:00 p.m.). The cultivation soil used herein was obtained by mixing 10% of commercially available Hyuga Soil (small grain) into another soil (Sakata small seedling-cultivating soil, Super-Mix), and cultivation was conducted without any water being supplied. At the outset of the experiment, the "white blossom" had a plant height of 25 cm and showed uniform root distribution in the pot.

In this cultivation, "white blossom *Pieris japonicum*" was grown continuously for about 3 months or more, and further, it flowered. When the moisture vapor-permeable film was taken off after cultivation for about one month, it was observed that the soil corresponding to the portion immersed in the underground water was wet, and the *Pieris japonicum* showed a good density of the roots.

Comparative Example 3

The same experiment was conducted in the manner as in Example 3, except that an agricultural plant-cultivating pot made of water vapor-impermeable polyethylene (diameter of 12 cm×12 cm, depth 9.8 cm) was used instead of the selective moisture vapor-permeable film used in Example 3. More specifically, using the same soil as in Example 3, *"Pieris japonicum"* (having a plant height of 25 cm and being uniform in view of the root distribution state thereof in the pot) was planted into the above-mentioned plant-cultivating pot made of polyethylene. At the outset of the experiment, as the *"Pieris japonicum"*, those having a plant height of 25 cm and showing uniform root distribution in the pot were selected. From the start of the experiment, the *"Pieris japonicum"* was cultivated without any water being supplied thereto.

In the case of this cultivation experiment, the experimental stocks withered in about 2 weeks.

Example 4

As a selective moisture vapor-permeable film (moisture vapor-permeable film of penetration-vaporization type) which was water-impermeable, there was used a polyvinyl alcohol (PVA) film having a moisture vapor-permeability of about 2,000 g/(m$^2$·24 hours) (film thickness about 40μ, mfd. by Aicello Chemical Co., Ltd.). This film was heat-bonded for 1.2 seconds by means of a 460 W-heat sealer so as to form a film container of a rectangular parallelepiped shape having each of longitudinal and lateral sizes of about 8 cm, and a depth of about 5.5 cm. Water was poured into the thus obtained film container, and it was confirmed that the film container showed no water leakage therefrom.

About 190 g of compost (Super-Mix A, mfd. by Sakata Seed Corp.) was placed in the above-mentioned film container, which was itself then placed in a vat made of stainless steel and filled with well water, and the amount of water in the vat was adjusted so that the film container was immersed in the well water to a depth of about 5.5 cm. The film container was secured by a weight so that it did not float up out of the water in the vat.

Small seedlings of tomato (obtained by sowing tomato seeds named "Number-One in the World" into Soil-Mix B (mfd. by Sakata Seed Corp.) as compost placed in a 48-hole plug tray, whereby the seeds germinated at around 7-10 days after sowing) were transplanted into the above-mentioned film container, and cultivated in a greenhouses at a cultivation temperature of 16-28° C.

On the other hand, as a control experiment, about 190 g of the above-mentioned compost was placed in a "No. 3.5"-pot (mfd. by Kaneya Shohten CO., LTD., hard plastic pot, which was water-impermeable and moisture vapor-impermeable) having almost equal volume to that of the above-mentioned film container, and the above-mentioned tomato seedlings were transplanted thereto, and cultivated in a greenhouses at a cultivation temperature of 16-28° C.

When the tomato seedlings were cultivated without the film container having the selective moisture vapor-permeability and containing the transplanted tomato seedlings being immersed in the water in the vat, the tomato seedlings withered in about 1 week. However, the small tomato seedlings grew successfully when the film container was immersed in water in the stainless steel vat in the above-mentioned manner.

On the other hand, the small tomato seedlings withered in about 2 weeks when cultivated without supply of water by irrigation to the tomato seedlings which had been transplanted into the "No. 3.5"-pot which was water- and moisture vapor-impermeable. In addition, the small tomato seedlings grew successfully when about 57 ml of water per day (equivalent to the amount of moisture vapor passing to the inside of the selective moisture vapor-permeable film container per day) was supplied every day by irrigation to the small seedlings which had been transplanted into the "No. 3.5"-pot.

For a period of 1.5 months, there were observed the tomato seedlings which had been cultivated in the selective moisture vapor-permeable film container immersed in water in the stainless steel vat in the above-mentioned manner, and the tomato seedlings which had been cultivated in the water-impermeable and moisture vapor-impermeable pot with water being supplied thereto every day by irrigation in the above-mentioned manner. As a result, in the tomato seedlings which had been cultivated in the water-impermeable and moisture vapor-impermeable pot, the internode length of the above-ground parts increased, whereas the lower leaves withered, presumably due to lack of fertilizer. In contrast, in seedlings which had been cultivated in the selective moisture vapor-permeable film container immersed in water in the stainless steel vat, the internode length was short, and leaves grew fairly thickly, without withering of the lower leaves. In addition, with respect to the state of the underground portion (roots), the density of roots of the seedlings which had been cultivated in the selective moisture vapor-permeable film container was much higher than that in the seedlings which had been cultivated in the water-impermeable and moisture vapor-impermeable pot.

Example 5

In the cultivation experiments in Example 4, wherein small tomato seedlings were cultivated by respectively using the selective moisture vapor-permeable film container immersed in water, and the water-impermeable and moisture vapor-impermeable pot (supplied with 57 ml of water by irrigation every day), the sensor portion of a soil-oxygen measuring device (catalog name: DIK-5050, mfd. by Daiki-Rika Kogyo Co., Ltd.) was buried in the soil portion of each container to thereby measure the soil oxygen concentration at intervals of 12 hours. The results obtained are shown in FIG. 9.

Further, changes in the soil oxygen concentration with the elapse of days were also measured in the same manner until 40 days from the start of cultivation. The results obtained are shown in FIG. 10.

Figure 9:
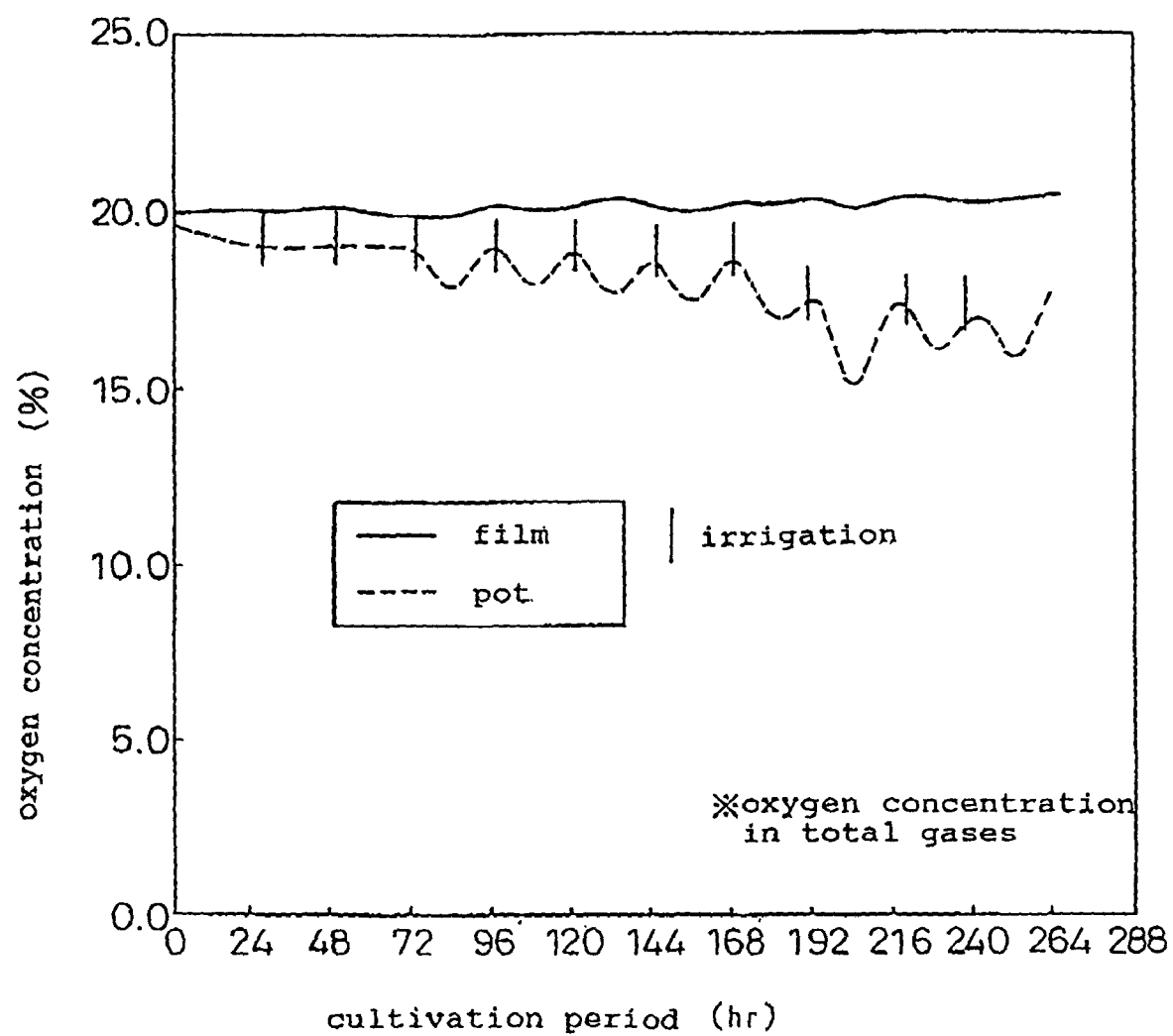
FIG. 9 is a graph showing the oxygen concentrations corresponding to every 12 hours in compost, obtained in an Example of the present invention.

As can be understood from FIG. 9, the oxygen concentration of the soil in the water-impermeable and moisture vapor-impermeable pot showed variation during one day, i.e. after about four days from the start of cultivation. More specifically, in this measurement, a low oxygen concentration was observed after irrigation, and the oxygen concentration in the soil decreased gradually as the cultivation period increased. In contrast, substantially no change in the soil oxygen concentration during a day was observed in the case of the selective moisture vapor-permeable film container, and the soil oxygen concentration was always about equal to the oxygen concentration in the air.

Figure 10:
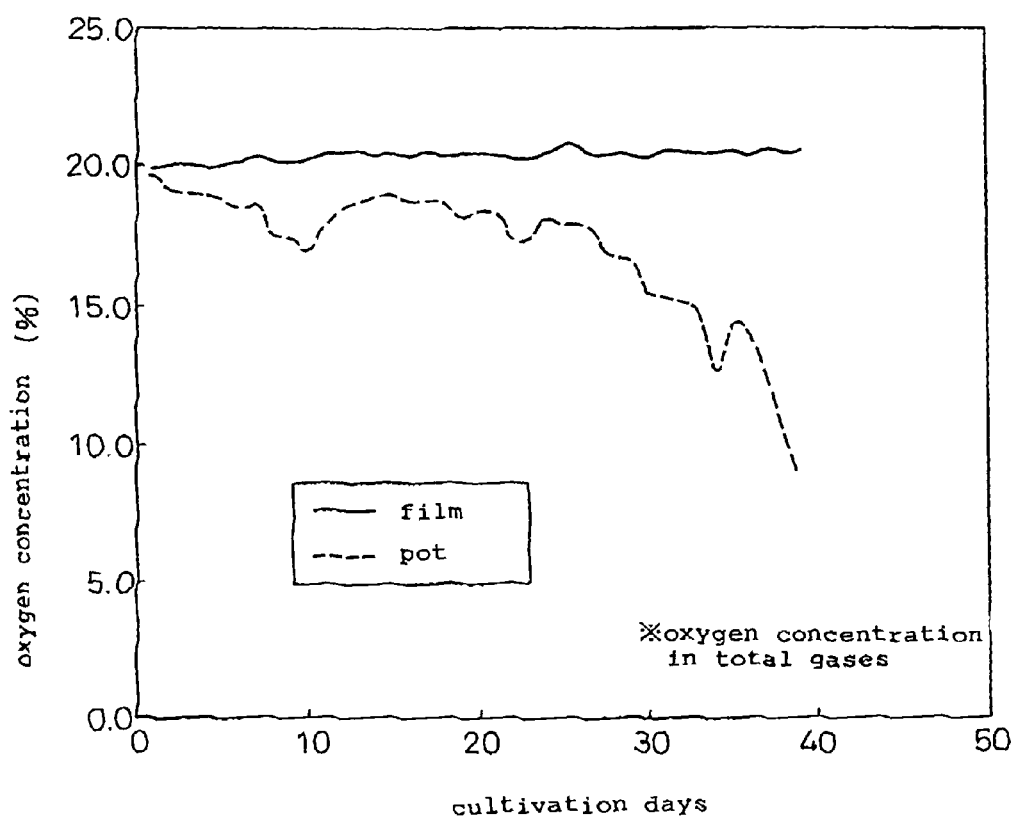
FIG. 10 is a graph showing changes in the oxygen concentration in compost with the elapse of time in one day during a test cultivation period, obtained in an Example of the present invention.

Further, as can be understood from FIG. 10, the oxygen concentration in the soil in the water-impermeable and moisture vapor-impermeable pot decreased markedly as the cultivation period increased, and reached about 40% of the oxygen concentration in the air after a 40 day-cultivation. In contrast, in the case of the selective moisture vapor-permeable film container, the oxygen concentration in the soil was maintained at about equal to the oxygen concentration in the air. From the above experiments, it was demonstrated that in the case of cultivation in the water-impermeable and moisture vapor-impermeable pot, voids in the soil because blocked with irrigation water and the oxygen concentration in the rhizosphere greatly decreased, whereby cultivation of seedlings was seriously hindered; but on the other hand, moisture vapor was supplied by the water vapor in the case of the selective moisture vapor-permeable film container, whereby the above-mentioned problems were prevented from occurring.

Example 6

In the cultivation experiments in Example 4, wherein small tomato seedlings were cultivated by respectively using the selective moisture vapor-permeable film container immersed in water, and the water-impermeable and moisture vapor-impermeable pot (supplied with 57 ml of water by irrigation every day), the moisture vapor content, EC (electric conductivity), pH and the ion content in the compost were measured at the start of cultivation (cultivation, at first) and after a one and a half month-cultivation. The results obtained are shown in the following Table 1. In Table 1, in the case of using a film (experimental plot using film), "near to root" denotes a site showing a high root density, while "far from root" denotes a site showing a low root density.

TABLE 1

(Ionic analylis by using water extraction of compost after cultivation of small tomato seedlings)

moisture content, EC, pH

| Experimental plots | moisture content (%) | EC (mS/cm) | pH |
|---|---|---|---|
| Super-Mix A (start of experiment) | 74.0 | 0.38 | 6.5 |
| Experimental plots using pot | 80.8 | 0.06 | 7.1 |
| Experimental plots using film (near to root) | 51.4 | 0.25 | 6.8 |
| Experimental plots using film (far from root) | 35.0 | 0.69 | 6.3 |

Anions

| Experimental plots | $PO_4$ | $NO_3$ |
|---|---|---|
| Super-Mix A (start of experiment) | 1340 | 1711 |
| Experimental plots using pot | 0 | 0 |
| Experimental plots using film (near to root) | 293 | 0 |
| Experimental plots using film (far from root) | 747 | 21 |

Cations

| Experimental plots | Na | $NH_4$ | K | Mg | Ca |
|---|---|---|---|---|---|
| Super-Mix A (start of experiment) | 241 | 86 | 870 | 95 | 737 |
| Experimental plots using pot | 318 | 0 | 0 | 61 | 419 |
| Experimental plots using film (near to root) | 144 | 7 | 35 | 54 | 425 |
| Experimental plots using film (far from root) | 182 | 110 | 344 | 102 | 626 |

The analytical value of ions are represented by the weights thereof per 1 kg of dry soil (mg/kg).

As will be understood from Table 1, in the case of using the water-impermeable and moisture vapor-impermeable pot (experimental plot using pot), the inorganic ion content, based on the fertilizer in the compost, decreased markedly after completion of cultivation, as compared with that in the experimental plot using the film. Such a decrease suggests that inorganic ions are carried out from the pot by irrigation. On the other hand, in the case of the experimental plot using the film, the flow-out of ions due to irrigation is not conceivable, and therefore it is considered that the decrease in the ion content in the "near to root" site is attributable to absorption thereof by the plant.

INDUSTRIAL APPLICABILITY

As described above, according to the present invention, there is provided a plant-cultivating container having a receiving portion for receiving a plant body; the container having, as at least a portion thereof, a selective moisture vapor-permeable portion which prevents water from passing through it, but allows water vapor to pass through.

The present invention also provides a plant-cultivating method, comprising:

providing a plant-cultivating container having a receiving portion for receiving a plant body; the container having, as at least a portion thereof, a selective moisture vapor-permeable portion which prevents water from passing through it, but allows water vapor to pass through;

disposing a plant body-retaining support and a plant body in the container; and cultivating the plant body while having at least the selective moisture vapor-permeable portion in contact with water.

At least a part of the plant-cultivating container according to the present invention having the above-mentioned structure is imparted with "selective moisture-vapor permeability", i.e. it is water-impermeable but water vapor-permeable. Accordingly, when such a container is placed in contact with water, water per se cannot pass into the container through the moisture vapor-permeable portion having selective moisture-vapor permeability, but water vapor can selectively pass into the container. As a result, the relative humidity in the container can be increased to a degree which contributes to the growth of the plant in the container.

In the present invention, on the basis of the above-mentioned selective passage of water vapor into the container, the frequency of supply and/or the amount of water per se provided to a plant by a measure such as irrigation can be, at least, reduced markedly.

In addition, in the present invention, the moisture content which is necessary for the cultivation of a plant is supplied in the form of "water vapor" through the selective moisture vapor-permeable portion as described above, and therefore the quality of the water used as the source of water vapor is of less importance. In other words, in the present invention, it is possible to utilize water which was hitherto difficult to use in a conventional cultivation method, such as salt water (seawater), hard water, soft water, and waste water.

What is claimed is:

1. A plant-cultivating system comprising:
a water tank; and
a plant-cultivating container in the water tank, the container having an opening for receiving a plant, wherein at least a part of the container is formed of a non-porous hydrophilic film comprising a material selected from the group consisting of polyvinyl alcohols and copolymers thereof, wherein the container is in the water tank such that at least a portion of the non-porous hydrophilic film is in contact with water in the water tank and substantially spaced from the water tank, and water in the water tank is at a level below the opening.

2. A plant-cultivating system according to claim 1, wherein the non-porous hydrophilic film has a moisture vapor-permeability of $1 \times 10^3$ g/m$^2$·24 hours or more.

3. A plant cultivating system according to claim 1, wherein the surface area of the non-porous hydrophilic film is 20% or more of the total outside surface area of the plant cultivating container.

4. A plant-cultivating system according to claim 3, wherein the surface area of the non-porous hydrophilic film is 100% of the total outside surface area of the plant cultivating container.

5. A plant-cultivating system according to claim 1, wherein a water-permeable material different from the non-porous hydrophilic film is laminated on the non-porous hydrophilic film.

6. A plant-cultivating method, comprising:
providing a plant-cultivating system comprising:
a water tank containing water;
a plant cultivating container having an opening for receiving a plant wherein at least a part of said plant-cultivating container is formed of a non-porous hydrophilic film made of a material selected from the group consisting of polyvinyl alcohols and copolymers thereof wherein the water in the water tank is at a level below the opening and in contact with the non-porous hydrophilic film; and
a plant-retaining support in the plant-cultivating container;
placing a plant in the plant-retaining support in the plant-cultivating container; and
allowing the water to contact the plant through the non-porous hydrophilic films, thereby cultivating the plant.

7. A plant-cultivating method according to claim 6, wherein the temperature of the water in the water tank is controlled to maintain a temperature of a rhizosphere of the plant within a range from 15 to 25° C.

8. A plant-cultivating method according to claim 6, wherein the water in the water tank is water that would not normally be considered suitable for the growth of a plant.

9. A plant-cultivating method according to claim 8, wherein the water in the water tank is selected from the group consisting of salt water, polluted water, hard water or combinations thereof.

* * * * *